(12) United States Patent
Puniyani et al.

(10) Patent No.: US 11,252,483 B2
(45) Date of Patent: Feb. 15, 2022

(54) SYSTEMS AND METHODS FOR SUMMARIZING MISSED PORTIONS OF STORYLINES

(71) Applicant: Rovi Guides, Inc., San Jose, CA (US)

(72) Inventors: Aman Puniyani, Rohtak (IN); Ankur Anil Aher, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/204,507

(22) Filed: Nov. 29, 2018

(65) Prior Publication Data

US 2020/0177971 A1 Jun. 4, 2020

(51) Int. Cl.
*H04N 21/8549* (2011.01)
*H04N 21/20* (2011.01)
*H04N 21/278* (2011.01)

(52) U.S. Cl.
CPC ....... *H04N 21/8549* (2013.01); *H04N 21/278* (2013.01)

(58) Field of Classification Search
CPC .......................... H04N 21/234; H04N 21/235
See application file for complete search history.

(56) References Cited

U.S. PATENT DOCUMENTS

| | | |
|---|---|---|
| 6,154,771 A | 11/2000 | Rangan |
| 6,239,794 B1 | 5/2001 | Yuen |
| 6,564,378 B1 | 5/2003 | Satterfield |
| 6,829,781 B1 * | 12/2004 | Bhagavath .......... H04N 21/235 375/E7.004 |
| 7,165,098 B1 | 1/2007 | Boyer |
| 7,313,808 B1 | 12/2007 | Gupta |
| 7,761,892 B2 | 7/2010 | Ellis |
| 7,840,977 B2 | 11/2010 | Walker |
| 8,046,801 B2 | 10/2011 | Ellis |
| 8,230,343 B2 | 7/2012 | Logan |
| 8,650,599 B2 | 2/2014 | Shindo |
| 8,769,571 B2 * | 7/2014 | de Leon ................ G06F 16/739 725/38 |
| 9,094,738 B2 | 7/2015 | Kishore |
| 9,158,435 B2 | 10/2015 | Clark |
| 9,286,938 B1 | 3/2016 | Tseytlin |
| 9,486,698 B2 | 11/2016 | Chung |

(Continued)

FOREIGN PATENT DOCUMENTS

| | | |
|---|---|---|
| WO | WO2009066213 | 5/2009 |
| WO | WO2016057416 | 4/2016 |

OTHER PUBLICATIONS

U.S. Appl. No. 15/696,743, filed Sep. 6, 2017, Vishwas Sharadanagar Panchaksharaiah.

(Continued)

*Primary Examiner* — Mushfikh I Alam
(74) *Attorney, Agent, or Firm* — Haley Guiliano LLP

(57) ABSTRACT

The system and methods described herein provided storyline summaries of missed content to users timed to reduce interruptions of content. A summary application detects missed content, that comprises a plurality of storylines. The summary application also identifies a storyline of current content being generated for presentation and retrieves a storyline-specific summary of a portion of the missed content comprising the current storyline. The summary application then generates, for presentation, the retrieved storyline-specific summary.

20 Claims, 11 Drawing Sheets

(56) References Cited

U.S. PATENT DOCUMENTS

| | | |
|---|---|---|
| 9,743,119 B2 | 8/2017 | Todd |
| 10,182,271 B1 | 1/2019 | Sanchez |
| 2002/0174430 A1 | 11/2002 | Ellis |
| 2003/0154479 A1 | 8/2003 | Brenner |
| 2004/0088723 A1 | 5/2004 | Ma |
| 2005/0086703 A1 | 4/2005 | Gupta |
| 2005/0097621 A1* | 5/2005 | Wallace .............. H04N 21/8549 725/135 |
| 2005/0193425 A1 | 9/2005 | Sull |
| 2005/0251827 A1 | 11/2005 | Ellis |
| 2006/0064733 A1* | 3/2006 | Norton ................ H04N 21/8545 725/135 |
| 2006/0106971 A1 | 5/2006 | Mahar |
| 2006/0149781 A1 | 7/2006 | Blankinship |
| 2007/0101369 A1* | 5/2007 | Dolph ................ H04N 7/17318 725/46 |
| 2007/0168864 A1 | 7/2007 | Yamamoto |
| 2007/0201558 A1 | 8/2007 | Xu |
| 2009/0235308 A1 | 9/2009 | Ehlers |
| 2010/0153885 A1 | 6/2010 | Yates |
| 2010/0195975 A1* | 8/2010 | Issa ........................... H04N 9/79 386/343 |
| 2011/0194839 A1* | 8/2011 | Gebert .................. H04N 21/47 386/290 |
| 2011/0293250 A1 | 12/2011 | Deever |
| 2014/0068661 A1* | 3/2014 | Gates, III ............ H04N 21/441 725/34 |
| 2014/0101707 A1* | 4/2014 | Kishore ................. G11B 27/10 725/88 |
| 2014/0281982 A1 | 9/2014 | Clark |
| 2014/0281989 A1 | 9/2014 | Clark |
| 2014/0282759 A1 | 9/2014 | Harvey |
| 2015/0023650 A1* | 1/2015 | Austin .................... G11B 27/30 386/241 |
| 2015/0058175 A1 | 2/2015 | Axt |
| 2015/0143436 A1* | 5/2015 | Gibbon .............. H04N 21/8549 725/88 |
| 2016/0014482 A1 | 1/2016 | Chen |
| 2016/0057475 A1 | 2/2016 | Liu |
| 2016/0088352 A1 | 3/2016 | Agarwal |
| 2016/0227282 A1* | 8/2016 | Chang ................ H04N 21/4821 |
| 2016/0249116 A1 | 8/2016 | Harb |
| 2016/0261929 A1 | 9/2016 | Lee |
| 2017/0078447 A1* | 3/2017 | Hancock ............... G06F 1/3215 |
| 2017/0109584 A1 | 4/2017 | Yao |
| 2017/0134828 A1* | 5/2017 | Krishnamurthy .... H04N 21/439 |
| 2017/0142481 A1* | 5/2017 | Caruana ............... H04N 21/233 |
| 2017/0182283 A1* | 6/2017 | Palmateer ............. A61M 21/02 |
| 2017/0223413 A1* | 8/2017 | Kozloski ............. H04N 21/252 |
| 2017/0230731 A1 | 8/2017 | Amento |
| 2017/0272818 A1* | 9/2017 | Gattis ................ H04N 21/4415 |
| 2017/0332125 A1* | 11/2017 | Panchaksharaiah ........................ H04N 21/26283 |
| 2017/0374120 A1* | 12/2017 | Vishnia .................. H04L 65/601 |
| 2018/0008894 A1* | 1/2018 | Sack ....................... G06Q 50/10 |
| 2018/0081618 A1* | 3/2018 | McLean ............. H04N 21/4394 |
| 2018/0349368 A1* | 12/2018 | Bellingham .......... H04N 21/858 |
| 2018/0367835 A1* | 12/2018 | Hamidi-Rad ...... H04N 21/4126 |
| 2019/0035431 A1* | 1/2019 | Attorre .................... G10L 17/00 |
| 2019/0037278 A1* | 1/2019 | Ahonen ........... H04N 21/42653 |
| 2019/0075374 A1 | 3/2019 | Panchaksharaiah |
| 2019/0230387 A1* | 7/2019 | Gersten ................. H04N 21/854 |
| 2019/0268674 A1* | 8/2019 | Spears ............... H04N 21/4622 |
| 2019/0273972 A1* | 9/2019 | Soderbergh ........ H04N 21/8545 |
| 2020/0045384 A1* | 2/2020 | Nilsson .................. H04N 21/84 |
| 2020/0195983 A1* | 6/2020 | Chao ..................... G06F 16/745 |
| 2020/0304888 A1 | 9/2020 | Panchaksharaiah et al. |
| 2021/0058672 A1* | 2/2021 | Young .................. H04N 21/435 |
| 2021/0281930 A1 | 9/2021 | Panchaksharaiah et al. |

OTHER PUBLICATIONS

International Search Report and Written Opinion in Application No. PCT/US2018/049386, dated Nov. 6, 2018 (16 pages).

* cited by examiner

| Portion ID | Storyline ID | Start Time | End Time | Summary ID | Depends On Portion IDs |
|---|---|---|---|---|---|
| 41 | A | 5:00 | 5:05 | 41 | 9 |
| 42 | A | 5:05 | 5:10 | 42 | 41 |
| 43 | C | 5:10 | 5:15 | 43 | 42 |
| 44 | C | 5:15 | 5:20 | 44 | 43 |
| 45 | C | 5:20 | 5:25 | 45 | 44 |
| 46 | B | 5:25 | 5:30 | 46 | 32, 28, 10 |
| 47 | B | 5:30 | 5:35 | 47 | 46 |
| 48 | B | 5:35 | 5:40 | 48 | 47 |
| . | | | | | |
| . | | | | | |
| . | | | | | |
| 56 | C | 6:15 | 6:20 | 56 | 45 |

FIG. 2

SYSTEMS AND METHODS FOR SUMMARIZING MISSED PORTIONS OF STORYLINES

BACKGROUND

The present disclosure is directed to delivering summaries of missed portions of storylines and, more particularly, to systems and methods that time delivery of summaries of missed portions of storylines based on the relevance of the summary to the current content.

SUMMARY

Delivering timely and relevant summaries of past content in a storyline presents difficulties. Conventional systems for providing a user with summaries of missed content present a singular summary for all missed portions of a show without regard to the relevance of the whole summary to the current content being played to the user. The conventional systems, therefore, diminish the utility of summaries as users will be presented with summary information that is not pertinent to the current content. These conventional presentations of wholistic summaries are burdensome and, in fact, impede a user's enjoyment of content. Furthermore, the amount of bandwidth and time required to present a summary of all missed portions of content can be substantial. The amount of time required to consume a lengthy summary may overwhelm a user's viewing experience and may diminish the user's ability to consume the relevant portions of the summary. Moreover, summaries of storylines unrelated to the current content of a show may distract the user from current content with which the user is engaged.

Solutions over conventional systems for providing a user with summaries of missed content, especially summaries for missed portions relevant to the current content, are described herein. The systems and methods described herein achieve benefits over conventional systems by timing the display of different summaries of missed content based on the relevance of the summary with the current content.

A summary application detects that a user missed a previous portion of a storyline. For example, a summary application may receive information that a user watching a television series left a room in which the show is being played. Later, a summary application receives information that the user has returned to a room in which the show is being played and detects what content was played while the user was gone from the room. The summary application then detects which storylines were presented in the missed content, e.g., the summary application accesses metadata that identifies storylines based on time stamps. The summary application then detects the current storyline for the show based on content currently being played and retrieves a summary for the missed portions of that storyline. Therefore, if the user missed different portions of, for example, three storylines, the summary application can retrieve a summary of the missed portions specific to the current storyline. The summary application then generates for playback the storyline specific summary.

The summary application is, therefore, able to address deficiencies in conventional systems. The summary application provides an intuitive, user-friendly summary system that increases the utility of summaries by displaying a summary of the user's missed content most relevant to the current content. Because a summary of all of the user's missed content may contain portions that are not relevant, or only tangentially relevant, to the current content, a full summary could be lengthy. Therefore, the summary application can limit the length of time a summary is shown because the summary application need not present a summary of all the missed content and instead presents a relevant summary for the current content. This improvement also limits the amount of bandwidth necessary when retrieving summary content as the system need not retrieve audio, video, and text associated with other portions of content. Thus, the summary application operates more efficiently than conventional systems in its consumption of bandwidth and processing. By displaying less information during the summary of the current storyline, the summary application spares users from time-consuming summaries that impede the user's consumption as compared with conventional systems inundate the user with less relevant information in the content summary. The summary application reduces both the time required by conventional systems to playback summaries and the bandwidth and processing required by those systems.

The summary application may also detect when a storyline transition occurs, for example, by monitoring storyline identifiers present in the metadata for the current content. After a storyline transition, the summary application may determine whether a user consuming the content being presented missed any portions of the new storyline. If so, the summary application may retrieve a summary of the missed portions of the new storyline and generate that summary for presentation to the user. As compared to conventional systems, the summary application may present summaries of missed portions of storylines more efficiently and at more relevant times as a show progresses through various storylines which improves a user's enjoyment of content and retention of the storylines.

The summary application also reduces the amount of bandwidth required to retrieve summary content as the portions of summary most relevant to the current content are retrieved without requiring that a longer summary. For example, the summary application may retrieve pre-generated snippets that are intended to summarize different segments, portions, or content. When the summary application detects that a user is present, the summary application can retrieve a list of missed portions of content related to the current storyline and correlate the missed portions with summary snippets. For example, the summary application may retrieve a list of summary ids from a database column in a table relating segments, or portions of content, which summary snippets. The summary application may then concatenate the snippets into a single summary video or present several snippets to a user that collectively summarize the missed portions of content.

In some embodiments, the summary application may have access to summary content in various formats (e.g., text, video, audio, etc.) and/or different levels of detail (e.g., terse, normal, verbose). When retrieving the storyline summaries, the summary application may determine a format and/or detail level based on various conditions. Thus, the summary application retrieves summary content more efficiently than conventional systems by recognizing that different portions of summary content may be retrieved in different formats or detail levels. For example, the summary application may retrieve a terse textual summary for an ancillary storyline and may retrieve a verbose video summary for the current storyline. In some embodiments, the level of detail and/or format type may be based on a user's corresponding preferences. Thus, the summary application has the further benefit of tailoring the summary across storylines and users. In some embodiments, these same techniques may be applied to content that was watched by a user long ago. The summary application may use interaction logs identify portions of content that a user consumed in the past and determine, e.g., based on a complexity rating in metadata of a storyline, that the content should be refreshed. The summary application could then retrieve a summary for content already consumed that is related to the current storyline to ensure the user has full enjoyment of the present content. In some embodiments, a summary may be of sufficient length that the summary application may determine that a short summary of current content that will play should be included as well. This way the user will be caught up to the storyline when the user's attention returns to the current content.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 shows an illustrative embodiment of a data structure used to store information about portions of content, in accordance with some embodiments of the disclosure;

DETAILED DESCRIPTION OF THE DRAWINGS

Figure 1:
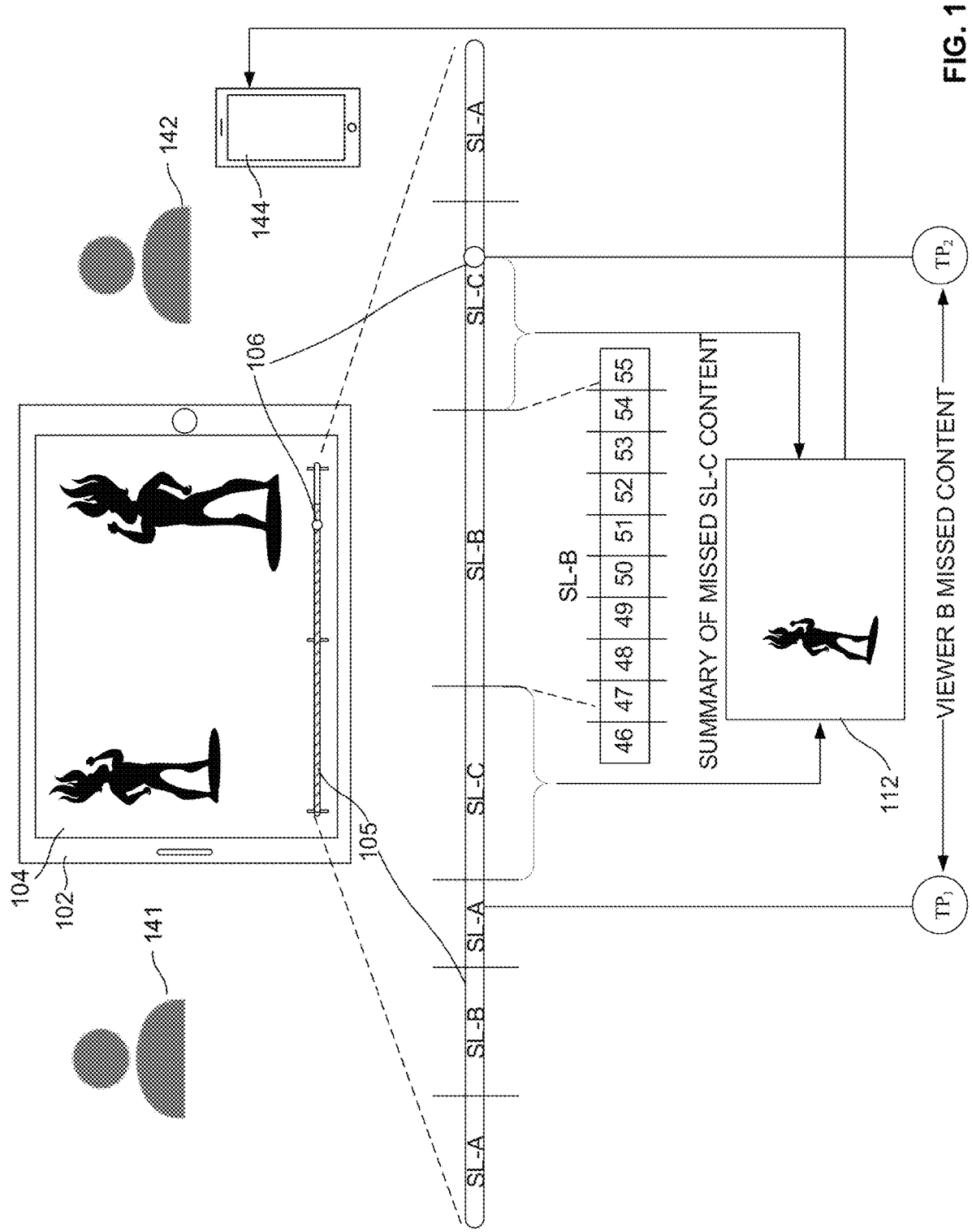
FIG. 1 shows an illustrative system for presenting missed portions of a storyline at a relevant time point, in accordance with some embodiments of the disclosure.

FIG. 1 shows an illustrative system for presenting missed portions of a storyline at a relevant time point. FIG. 1 depicts user equipment 102, which is displaying content 104 (illustrated as an animated movie). User equipment 102 is depicted as a tablet device in FIG. 1. In some embodiments, user equipment 102 may be a smartphone, set-top box, personal computer, or other device suitable for rendering content (e.g., movies, television shows, linear programming, and over-the-top (OTT) content). The user equipment is also displaying a time bar 105 that includes a current position indicator 106, which is approximately 80 percent down the time bar for the content.

In FIG. 1, two viewers are observing content 104—viewer A 141 and viewer B 142. The summary application detects that viewer B 142 missed some portion of the content 104 between two timepoints, $TP_1$ and $TP_2$. In some embodiments, the summary application may determine that viewer B 142 missed this portion of the content by tracking viewers that are present using a camera during display of the content. A camera may be a part of user equipment 102 and may track the faces of viewers A and B. In a scenario in which the camera is unable to detect one or more viewers for a time period, the summary application may determine that the user is absent and may record which portions of a content a viewer is missing in an interaction log. In some embodiments, the summary application may track which portions of content a viewer is present for and log that information in an interaction log specific to a viewer. The summary application may then reference the interaction log for that viewer at a later time and determine that specific content, or portions of content, are not in the interaction log, which indicates that the viewer missed the content or portions of content. The summary application may detect when viewer B returns to the viewing area of content 103 at a timepoint $TP_2$ (marked by current position indicator 106), e.g., using the same techniques used to build the interaction log. The summary application may also determine that a summary of the missed content between timepoints $TP_1$ and $TP_2$ should be presented to viewer B without interrupting the playback of media 104 for viewer A.

In FIG. 1, the summary application determines which portions of the missed content to include in the summary for viewer B. For example, the summary application may compare the time period for which viewer B was absent from the viewing area to the timeline of the content 104. Using that information, the summary application can determine which time period of the content 104 viewer B has missed. The summary application may split content 104 into portions of any appropriate size and the portions may not be the same size. The portions illustrated in FIG. 1 are exemplary.

FIG. 2 is an example of a data structure which contains information about portions which comprise content (e.g., content 104). The data structure may contain portion IDs, such as IDs 41-56 as illustrated in FIG. 2. Often content comprises one or more storylines which are narratives that, along with other narratives, makes up a plot in content. Portions of the content may correspond to various storylines. In FIG. 2, the data structure assigns each portion ID to a particular storyline ID (e.g., storylines A, B, and C). This indicates which portions are related to the same storyline (i.e., they make up the same narrative). Content may contain contiguous storylines or may switch between several storylines. As illustrated in FIG. 2, additional information in the data structure may include start and end points of each portion, dependency information between portions, summary identifiers, and other relevant information. In some embodiments, the information describing the portions and storylines which make up a content may be stored in the metadata of the content. By analyzing the metadata, the summary application may be able to determine which portions and storylines viewer B missed based on the timepoints $TP_1$ and $TP_2$.

In FIG. 1, viewer B has missed parts of storyline A, storyline B, and storyline C, and has returned during a presentation of storyline C (denoted as SL-A, SL-B, and SL-C in FIG. 1). The summary application determines a storyline specific summary for viewer B 142 when viewer B 142 returns at timepoint $TP_2$. The summary application may create a summary which only includes content that is necessary for viewer B 142 to understand the content 104 at timepoint $TP_2$. In other words, the summary application is generating content related to storyline C at timepoint $TP_2$. Therefore, the summary application can generate a summary relevant to the current content by summarizing the storyline C content that was missed by viewer B between timepoints $TP_1$ and $TP_2$. In some embodiments, the summary application may further include other portions of the content 104 on which storyline C is dependent in the summary at timepoint $TP_2$. The summary application may access the data structure in FIG. 2 to determine which portions of storyline A and B to include in the summary based on dependency. In some embodiments, the summary application may summarize other missed portions of the content 104 at a later point. For example, the summary application may present a summary of the missed portions of storyline A before playing the final section of storyline A. In another example, the summary application may present a summary of the missed portions of storyline B at the end of the program, as there are no other sections of storyline B after viewer B returns.

In some embodiments, the summary application may present a summary of missed storyline C content (and content on which storyline C is dependent) in summary presentation 112. The summary application may display summary presentation 112 on an additional user device 144, such as a mobile phone or tablet. In another embodiment, user equipment 102 may modify the display of content 104 so as to allow for the dual presentation of content 104 and summary presentation 112 (e.g., split screen presentation).

The instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

Applications may be, for example, stand-alone applications implemented on user equipment devices, content sources, or servers. For example, the summary application may be implemented as software or a set of executable instructions, which may be stored in storage (e.g., storage 308 or storage 414) and executed by control circuitry (e.g., control circuitry 304 or control circuitry 411). In some embodiments, applications may be client-server applications where only a client application resides on the user equipment device (e.g., user equipment 102) and a server application resides on a remote server (e.g., server 404). For example, applications may be implemented partially as a client application on control circuitry 304 of each one of user equipment devices 300 and user equipment system 301 and partially on a remote server such as a server application (e.g., server 404) running on control circuitry (e.g., 411) of the remote server. When executed by control circuitry of the remote server (such as server 404), the summary application may instruct the control circuitry to generate the content delivery application displays and transmit the generated displays to the user equipment devices. The summary application may instruct the control circuitry of the content source to transmit data for storage on the user equipment. The client application may instruct control circuitry of the receiving user equipment to generate the content delivery application displays.

Figure 3:
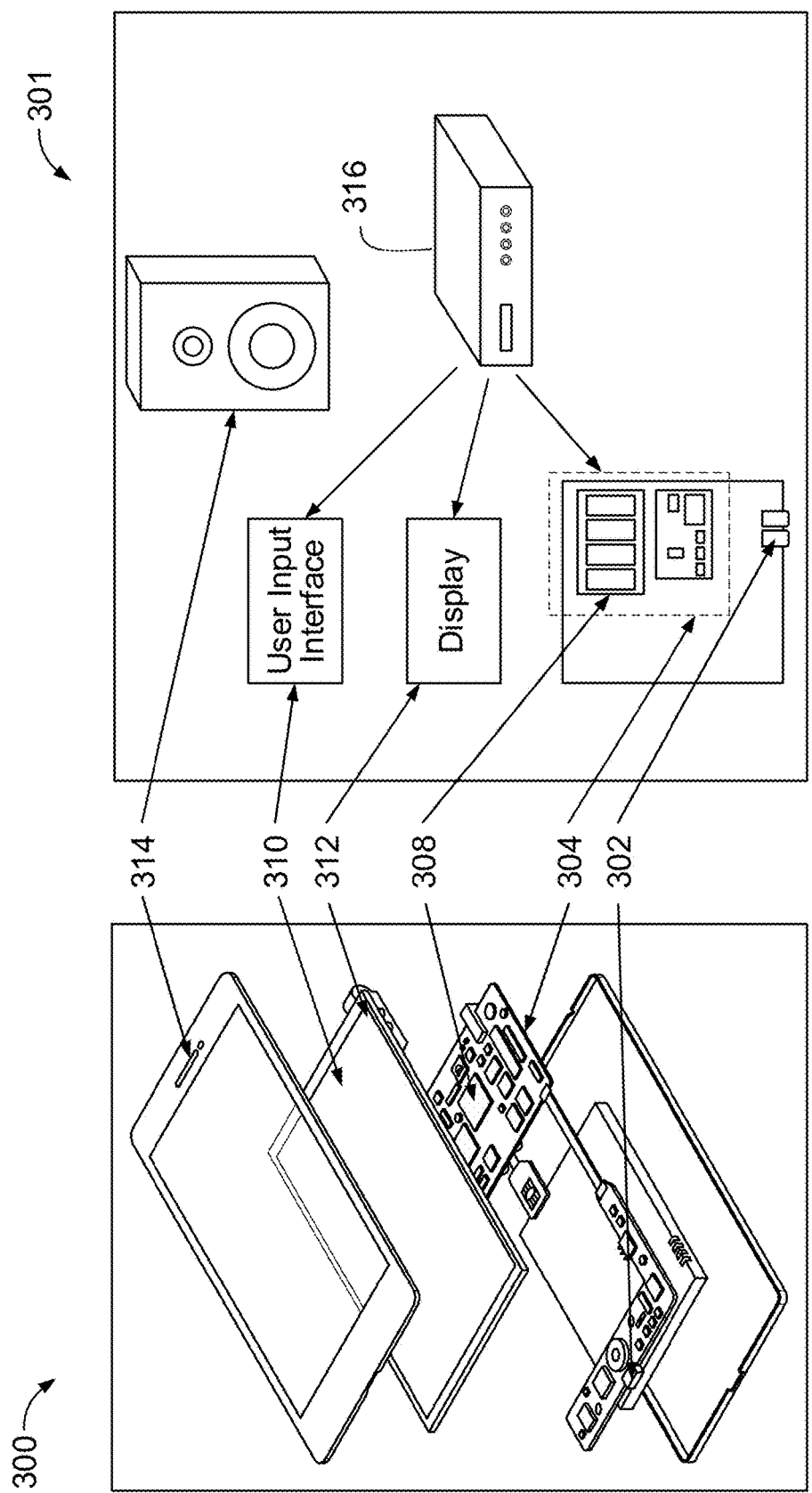
FIG. 3 is a block diagram of an illustrative user equipment, in accordance with some embodiments of the disclosure.

Users may access content and the applications from one or more of their media devices, e.g., user equipment. FIG. 3 shows generalized embodiments of an illustrative device, e.g., user equipment 102. For example, user equipment 102 may be a smartphone device, a tablet, or a remote control, such as illustrative user equipment 300. In another example, user equipment 102 may be part of a user equipment system 301. User equipment system 301 may include a set-top box 316. Set-top box 316 may be communicatively connected to speaker 314 and display 312. In some embodiments, display 312 may be a television display or a computer display. In some embodiments, set-top box 316 may be communicatively connected to user interface input 310. In some embodiments, user interface input 310 may be a remote-control device. Set-top box 316 may include one or more circuit boards. In some embodiments, the circuit boards may include control circuitry and storage (e.g., RAM, ROM, Hard Disk, Removable Disk, etc.). In some embodiments, circuit boards may include an input/output path. More specific implementations of user equipment devices are discussed below in connection with FIG. 4. Each one of user equipment devices 300 and user equipment system 301 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304 and storage 308. Control circuitry 304 may be used to send and receive commands, requests, and other suitable data using I/O path 302. I/O path 302 may connect control circuitry 304 to one or more communications paths (described below). I/O functions may be provided by one or more of these communications paths but are shown as a single path in FIG. 3 to avoid overcomplicating the drawing.

Control circuitry 304 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for an application stored in memory (e.g., storage 308). Specifically, control circuitry 304 may be instructed by the application to perform the functions discussed above and below. For example, the application may provide instructions to control circuitry 304 to generate the displays. In some implementations, any action performed by control circuitry 304 may be based on instructions received from the application.

In client server-based embodiments, control circuitry 304 may include communications circuitry suitable for communicating with a content recommendation application server (e.g., server 404) or other networks or servers. The instructions for carrying out the above-mentioned functionality may be stored on the content recommendation application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, non-transitory computer readable medium, or any other suitable fixed or removable storage devices, and/or any combination of the same. Storage 308 may be used to store various types of content, media guidance data, content summaries, and instructions for executing content access applications. Nonvolatile memory may also be used (e.g., to launch a boot-up routine and other instructions).

Control circuitry 304 may include video-generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video-generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch-and-record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touchscreen, touchpad, stylus input, joystick, voice recognition interface, or other user input interfaces. Display 312 may be provided as a stand-alone device or integrated with other elements of each one of user equipment device 300 and user equipment system 301. For example, display 312 may be a touchscreen or touch-sensitive display. In such circumstances, user input interface 310 may be integrated with or combined with display 312. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be integrated with the control circuitry 304. Speakers 314 may be provided as integrated with other elements of each one of user equipment device 300 and user equipment system 301 or may be stand-alone units. The audio component of videos and other content displayed on display 312 may be played through speakers 314. In some embodiments, the audio may be distributed to a receiver (not shown), which processes and outputs the audio via speakers 314.

The summary application may be implemented using any suitable architecture. For example, the summary application may be a stand-alone application wholly implemented on each one of user equipment device 300 and user equipment system 301. In such an approach, instructions for the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the applications are client-server-based applications. Data for use by a thick or thin client implemented on each one of user equipment device 300 and user equipment system 301 is retrieved on-demand by issuing requests to a server remote to each one of user equipment device 300 and user equipment system 301. In one example of a client-server-based summary application, control circuitry 304 runs a web browser that interprets web pages provided by a remote server (e.g., server 404). For example, the remote server may store the instructions for the application in a storage device (e.g., 414). The remote server may process the stored instructions using circuitry (e.g., control circuitry 411) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the applications are downloaded and interpreted or otherwise run by an interpreter or virtual machine (run by control circuitry 304). In some embodiments, the applications may be encoded in the ETV Binary Interchange Format (EBIF), received by control circuitry 304 as part of a suitable feed, and interpreted by a user agent running on control circuitry 304. For example, the applications may be an EBIF application. In some embodiments, the content delivery application may be defined by a series of JAVA-based files that are received and run by a local virtual machine or other suitable middleware executed by control circuitry 304. In some of such embodiments (e.g., those employing MPEG-2 or other digital media encoding schemes), the applications may be, for example, encoded and transmitted in an MPEG-2 object carousel with the MPEG audio and video packets of a program.

Figure 4:
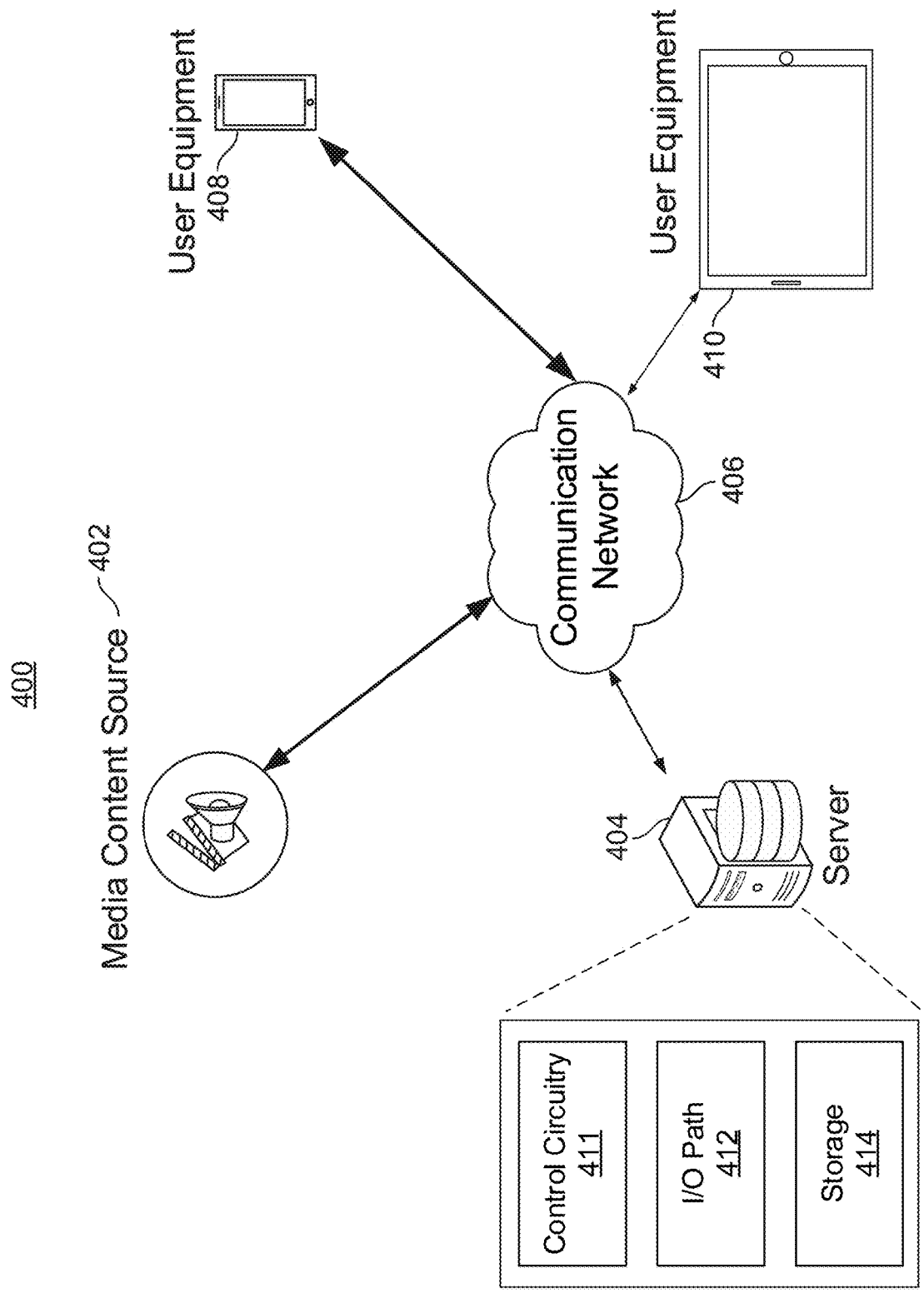
FIG. 4 is a block diagram of an illustrative media system, in accordance with some embodiments of the disclosure.

FIG. 4 is a diagram of an illustrative media system, in accordance with some embodiments of the disclosure. User equipment devices 408 and 410 (such as user equipment device 102 and/or 122) may be coupled to communication network 406. Communication network 406 may be one or more networks including the Internet, a mobile phone network, mobile voice or data network (e.g., a 4G or LTE network), cable network, public switched telephone network, or other types of communications network or combinations of communications networks. Paths (e.g., depicted as arrows connecting the respective devices to communication network 406) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 4 to avoid overcomplicating the drawing.

Although communications paths are not drawn between user equipment devices, these devices may communicate directly with each other via communication paths as well as other short-range, point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communication network 406.

System 400 includes media content source 402 and server 404. Communications with the media content source 402 and server 404 may be exchanged over one or more communications paths but are shown as a single path in FIG. 4 to avoid overcomplicating the drawing. In addition, there may be more than one of each of media content source 402 and server 404, but only one of each is shown in FIG. 4 to avoid overcomplicating the drawing. If desired, media content source 402 and server 404 may be integrated as one source device.

In some embodiments, the server 404 may include control circuitry 411 and storage 414 (e.g., RAM, ROM, Hard Disk, Removable Disk, etc.). The server 404 may also include an input/output path 412. I/O path 412 may provide device information, or other data, over a local area network (LAN) or wide area network (WAN), and/or other content and data to control circuitry 411, which includes processing circuitry, and storage 414. Control circuitry 411 may be used to send and receive commands, requests, and other suitable data using I/O path 412. I/O path 412 may connect control circuitry 304 (and specifically processing circuitry) to one or more communications paths.

Control circuitry 411 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 411 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 411 executes instructions for an emulation system application stored in memory (e.g., storage 414).

Memory may be an electronic storage device provided as storage 414 that is part of Control circuitry 411. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

Server 404 may retrieve guidance data from media content source 402, process the data as will be described in detail below, and forward the data to the client devices 408 and 410. Media content source 402 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 402 may be the originator of content (e.g., a television broadcaster, a Webcast provider, etc.) or may not be the originator of content (e.g., an on-demand content provider, an Internet provider of content of broadcast programs for downloading, etc.). Media content source 402 may include cable sources, satellite providers, on-demand providers, Internet providers, over-the-top content providers, or other providers of content. Media content source 402 may also include a remote media server used to store different types of content (including video content selected by a user), in a location remote from any of the client devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 402 may also provide summary data that can be used to create carousels and queries as described herein. Media content source 402 may also provide content summaries data that can be used to create summaries of missed content as described herein. Media guidance data and content summaries may be provided to the client devices using any suitable approach. Program schedule data and other guidance data may be provided to the client devices on a television channel sideband, using an in-band digital signal, using an out-of-band digital signal, or by any other suitable data transmission technique.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 404), which may be located centrally or at distributed locations, that provide cloud-based services to various types of users and devices connected via a network such as the Internet via communication network 406. In such embodiments, user equipment devices may operate in a peer-to-peer manner without communicating with a central server.

The systems and devices described in FIGS. 3 and 4 enable not only display of the screens of FIG. 1, but also enable the execution of processes described in FIGS. 5-12. It should be noted that each step of processes described in FIGS. 5-12 is performed by the previously described control circuitry (e.g., in a manner instructed to control circuitry 304 or 411 by a summary application). It should be noted that the embodiments of FIGS. 5-12x can be combined with any other embodiment in this description and are not limited to the devices or control components used to illustrate the processes.

Figure 5:
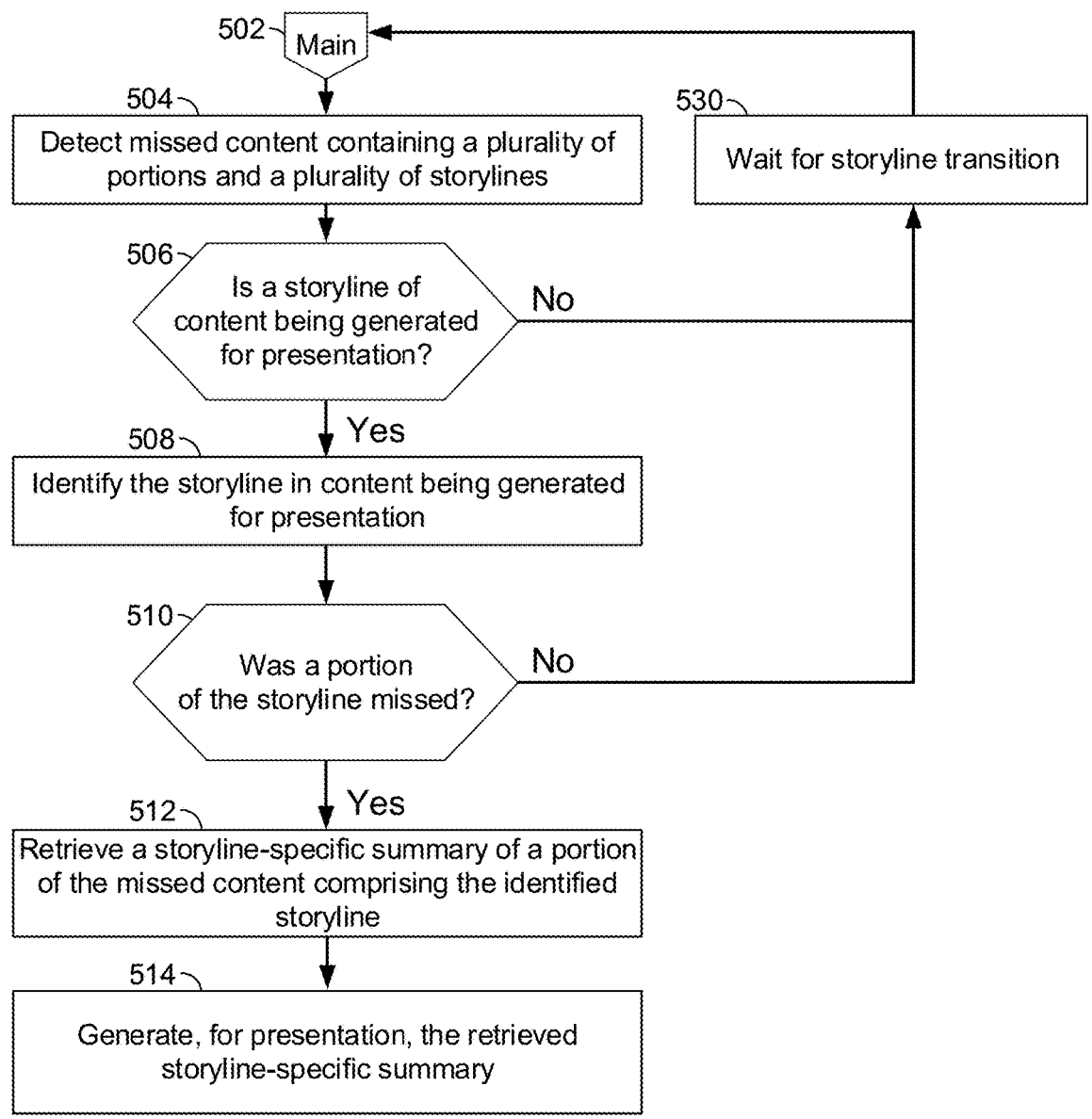
FIG. 5 is a flowchart of a detailed illustrative process for generating for display a summary for content, in accordance with some embodiments of the disclosure.

FIG. 5 is a flowchart of a detailed illustrative process for generating for display a summary for content, in accordance with some embodiments of the disclosure. A main loop of process 500 begins at step 502. At step 504, the summary application detects missed content, wherein the missed content comprises one or more portions and each portion comprises a different storyline. For example, the summary application may detect that a viewer (e.g., viewer B 142) is absent during a time period while user equipment 102 is presenting content (e.g., content 104). In some embodiments, the summary application may detect a viewer's absence through the use of a camera (e.g., as part of user equipment 300) which tracks viewers' faces. As described above, the summary application may build and access an interaction log for each viewer. In some embodiments, the summary application may access this interaction log from a remote server and one or more devices (e.g., user equipment devices 408 and 410) may contribute to logging the viewer's interaction with content. Other techniques for determine whether a user has interacted with specific content and/or the level to which a user has interacted with specific content is are described in greater detail in Agarwal et al. U.S. Patent Publ. No. 2016/0088352, published on Mar. 24, 2016, which is hereby incorporated by reference herein in its entirety. In some embodiments, the summary application may detect the viewer's presence through use of an additional user device (e.g., additional user device 144 or user equipment 408). The control circuitry (e.g., control circuitry 304) may detect the presence of the additional user device (e.g., through Bluetooth or Wi-Fi connectivity, GPS data, or another method). If the control circuitry detects that the additional user device has moved a certain distance away from a playback device (e.g., user equipment device 102), the summary application may determine that the viewer is not currently consuming the media. In some embodiments, the summary application may receive direct user input indicating that one viewer is temporarily leaving the viewer area and may receive additional input when the viewer returns. The summary application may record all portions which the user equipment played while the viewer was present in an interaction log for that viewer (e.g., viewer B 142). The summary application may consult the interaction log to determine which portions of the content the viewer has missed. The summary application may further consult a data structure (e.g., the data structure depicted in FIG. 2) to determine which storylines correspond to the portions that the viewer has missed. For example, the summary application may query the data structure using start and end times of the viewer's missed content, e.g., $TP_1$ and $TP_2$. Using the start and end times of the viewer's missed content, the query would identify rows from the data structure that coincide with the start and end times of the viewer's missed content. The data rows returned by this query would include identifiers for storylines in the missed content (e.g., A, B, and C).

At step 506, the summary application determines whether a storyline of content is being generated for presentation. For example, the summary application may determine if the media content source 402 is providing content to user equipment (e.g., user equipment 410) and if control circuitry (e.g., control circuitry 304 or 411) is generating, for display, content on user equipment 102. In some embodiments, the summary application may determine whether the content being generated for display on user equipment 102 contains part of a storyline. For example, some content may be output (e.g., commercials or advertisements) that is not part of a storyline in content. The summary application may determine whether the content is associated with a storyline by accessing metadata associated with the content being presented (e.g., metadata in a data table such as FIG. 2) and determine that the current presentation of content has no associated storyline or has data in the data table indicating there is no storyline. Or the summary application may find a storyline identifier (e.g., A, B, or C as in FIG. 2) associated with the current content. If the summary application determines that a storyline of content is not being generated for presentation, process 500 continues at step 530. If, instead, the summary application determines that a storyline of content is being generated for presentation, process 500 continues at step 508.

At step 530, the summary application waits for a storyline transition. This may entail control circuitry (e.g., control circuitry 304 or 411) accessing a data structure such as the data structure illustrated in FIG. 2. For example, the control circuitry may check metadata for the current content being presented as described above and then wait for a predetermined amount of time (e.g., 5 seconds) before checking whether the metadata has changed. Thus, the summary application may determine, based on the metadata in a data structure (e.g., as shown in FIG. 2), at what time point a storyline transition will occur. At the timepoint of the storyline transition, process 500 continues at steps 502 and 504. In some embodiments, the summary application may obtain metadata for the current portion to determine the current storyline and also retrieve metadata for the next portion of content following the current portion with a different storyline ID. Using the metadata for the next portion of content, the summary application can set a timer or other event flag to occur when the content reaches the start of the next portion. The summary application may also use this information to retrieve a storyline specific summary for the next storyline in advance of reaching a timepoint where the summary is needed.

At step 508, the summary application identifies the storyline in the content that is being generated for presentation. The control circuitry (e.g., control circuitry 304 or 411) may access metadata corresponding with the current content to retrieve a storyline identifier. In some embodiments, the control circuitry may access metadata sent embedded in data files that comprise the content or in data files provided to the control circuitry in parallel with the content. In some embodiments, the control circuitry may access a data structure (e.g., the data structure depicted in FIG. 2) to determine which storyline corresponds to the portion of the content that the user equipment 102 is currently generating, e.g., using time markers for the content.

At step 510, the summary application determines if a user (e.g., viewer B 142) has missed a portion of the storyline. The control circuitry (e.g., control circuitry 304 or 411) may access a data structure (e.g., the data structure depicted in FIG. 2) to determine which portions, of the content that the user equipment 102 has already presented, correspond to the same storyline that the user equipment 102 is currently generating. The summary application may then compare the portions of the same storyline with an interaction log for the user to see if any of the portions of the same storyline are absent from the log, indicating that the user missed those portions. In some embodiments, an interaction log contains a list of content and portions thereof (e.g., by timestamp) along with unique identifier for the user. Each row in such a log indicates portions of content the user previously consumed based on a system of presence detection during content presentation. If the summary application determines that the viewer has not missed any of the portions corresponding to the current storyline, then process 500 continues at step 530. If, instead, the summary application determines that the viewer has missed one or more portions corresponding to the current storyline, then process 500 continues at step 512.

At step 512, the summary application retrieves a storyline-specific summary of a portion of the missed content comprising the identified storyline. The control circuitry (e.g., control circuitry 304 or 411) may identify the portion IDs for the portions of the storyline that the viewer has missed by accessing a data structure (e.g., the data structure depicted in FIG. 2). The control circuitry may then retrieve summaries for the portions of the storyline in the missed content. For example, the summaries may be stored in the metadata for each portion of the content or the metadata may contain identifiers for summaries stored in a database (e.g., media content source 402), for the portions of the content. The control circuitry may retrieve the summaries from the media content source 402 and may transmit the summaries to the summary application. In some embodiments, once the control circuitry has retrieved all the summaries for the portions of the storyline that the viewer has missed, the summary application may concatenate the summaries to generate a summary for the entirety of the storyline-specific missed content.

At step 514, the summary application generates for presentation the retrieved storyline-specific summary. The summary may comprise summaries for one or more portions of missed content. In some embodiments, the control circuitry (e.g., control circuitry 304 or 411) may transmit the summary to a secondary user device (e.g., additional user device 144, user equipment 408, or user equipment 410) via I/O path (e.g., I/O path 302). In some embodiments, the summary application may display the summary on the same device on which it is displaying the content 104 (e.g., user equipment 102).

Figure 6:
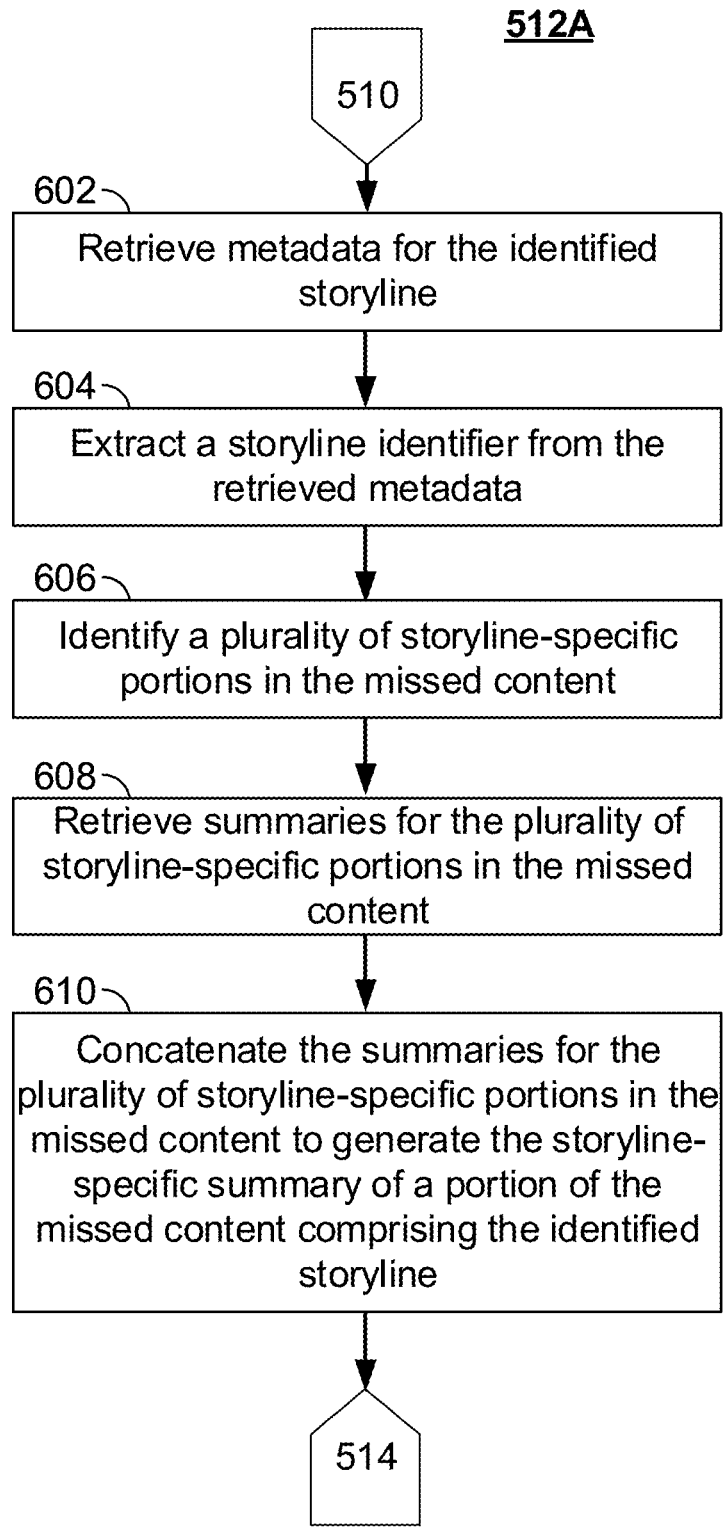
FIG. 6 is a flowchart of a detailed illustrative process for retrieving a storyline-specific summary of a portion of the missed content comprising the identified storyline, in accordance with some embodiments of the disclosure.

FIG. 6 is a flowchart of a detailed illustrative process for retrieving a storyline-specific summary of a portion of the missed content comprising the identified storyline, in accordance with some embodiments of the disclosure. Process 512A is one embodiment of a method for performing step 512 of FIG. 5 and begins after step 510. At step 602, the summary application retrieves metadata (e.g., using control circuitry 304 or 411) for the identified storyline. In some embodiments, the control circuitry may access metadata sent embedded in data files that comprise the content or in data files provided to the control circuitry in parallel with the content. The metadata may include a storyline identifier for each portion, indicating to which storyline each portion corresponds. At step 604, the summary application extracts a storyline identifier from the retrieved metadata. In some embodiments, the summary application may analyze the metadata to locate field that comprises the storyline identifier.

At step 606, the summary application identifies storyline-specific portions in the missed content, each of the storyline-specific portions associated with the storyline identifier. The control circuitry may access a data structure (e.g., the data structure depicted in FIG. 2) and an interaction log for viewer B indicating which portions of the content viewer B consumed, both of which may be stored in a storage (e.g., storage 308 or 414). The summary application may determine that portions which do not appear in the interaction log are missed portions of the content. The summary application may further identify which portions, of the portions which do not appear in the interaction log, have a storyline identifier (e.g., from the data structure of FIG. 2). The summary application may, using this information, identify missed portions with a storyline identifier that matches the extracted storyline identifier for the current content.

At step 608, the summary application retrieves summaries for the storyline-specific portions in the missed content. The control circuitry (e.g., control circuitry 304 or 411) may retrieve summaries, e.g., snippets, that summarize each identified portion from storage (e.g., 308 or 414). The metadata may alternatively contain a hyperlink pointing to a summary stored in a database (e.g., media content source 402). In this case, the control circuitry may retrieve the summary from media content source 402 via I/O path (e.g., 302 or 412). Additionally, or alternatively, the summary application may have added functionality for generating a summary from a portion of content. Such functionality may comprise accessing (e.g., via control circuitry) information describing the storyline-specific portions (e.g., from storage 308 or 414 or media content source 402). The summary application may analyze this information to determine which parts, of a particular portion, contain important material for narrative comprehension. Such important material may include a plot point, introduction of a new character, an action sequence, important dialogue, or a number of other events. Based on this determination, the summary application may identify which time frames and/or clips within the portion are necessary for comprehension of the overall narrative. The summary application may then splice the important frames and/or clips of the content together to create a montage. The summary application may transmit this montage summary to the user equipment device 144 for display on screen 312. Additionally, or alternatively, the summary application may analyze the closed captioning text and metadata description for the portion of missed content. The summary application may condense the information into a text summary, including only the information which was identified as important. The summary application may (e.g., using IO path 302 or 412) transmit the text summary to a user device. The summary application may optionally compile the video montage and text summary together to create a holistic summary for the viewer. Optionally, the summary application may generate a voice-over of the text summary (e.g., for output through speaker 314) through text-to-voice technology. Control circuitry may display the montage summary on display 312 of the user device 300 and may output the voice-over summary through speaker 314.

The summary application may retrieve any version of this generated summary for presentation to the viewer.

At step 610, the summary application concatenates the retrieved summaries for the storyline-specific portions in the missed content to generate the storyline-specific summary of a portion of the missed content comprising the identified storyline. The summary application may concatenate the storyline-specific summaries by creating a new file with the compiled summaries. For example, the summary application may retrieve metadata for each portion being summarized (e.g., as displayed in the data structure of FIG. 2). Using this information, the summary application may determine a chronological order in which to display the portion summaries. Additionally, or alternatively, the summary application may order the portion summaries according to other criteria. For example, the summary application may (e.g., using control circuitry 304 or 411) access metadata which describes how the portions are interconnected. The metadata may indicate that certain portions contain the same character, narrative, event, or some other component. The summary application may then order the portion summaries according to portions which possess such similarities. Control circuitry may store the newly concatenated summary in storage. The summary application may transmit the portion summaries, in the correct order, to a queue on server 404 or directly to user equipment or display devices. Process 512A then continues with step 514, in which the summary application generates, for presentation, the concatenated storyline-specific summary.

Figure 7:
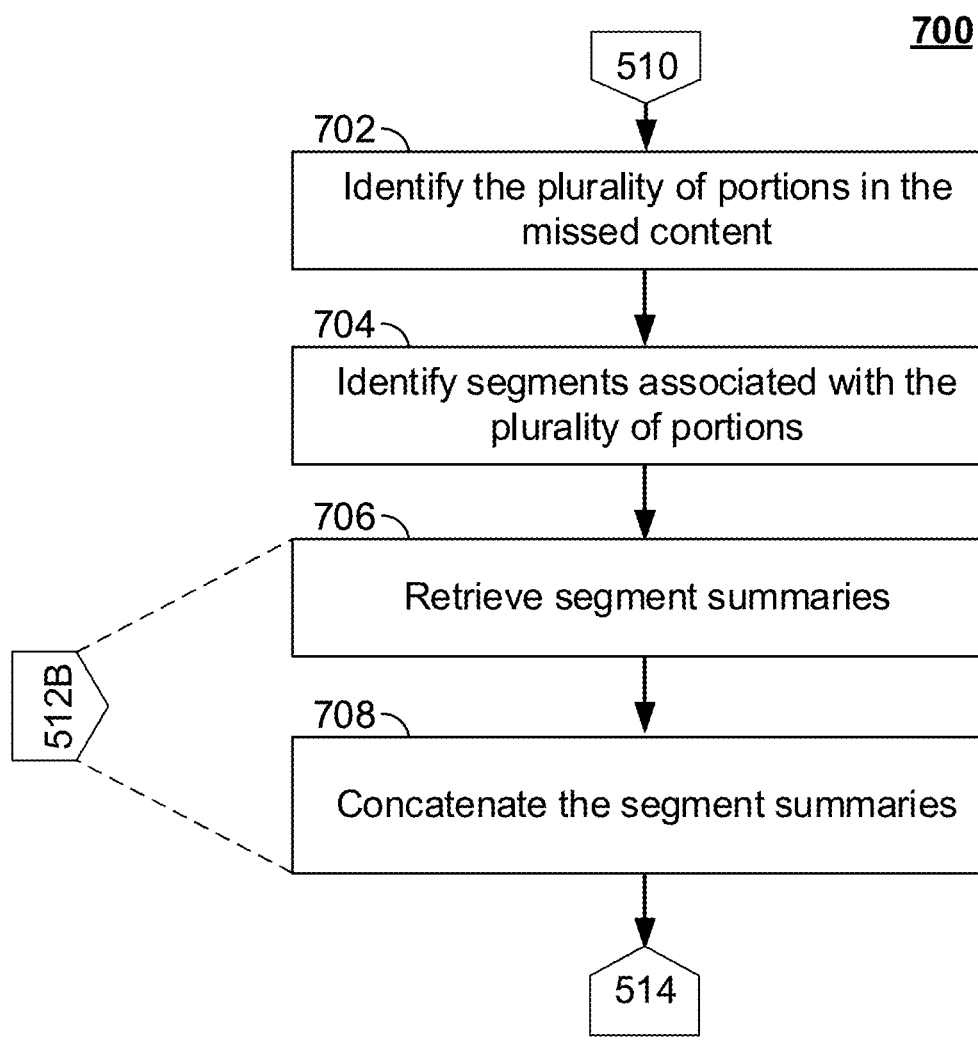
FIG. 7 is a flowchart of a detailed illustrative process for retrieving and concatenating storyline-specific summaries for portions of the missed content comprising the identified storyline, in accordance with some embodiments of the disclosure.

FIG. 7 is a flowchart of a detailed illustrative process for retrieving and concatenating storyline-specific summaries for portions of the missed content comprising the identified storyline, in accordance with some embodiments of the disclosure. Process 700 begins after step 510 and includes an alternative embodiment for completing step 512 (e.g., process 512B). At step 702, the summary application identifies the portions in the missed content. The summary application may use a number of the previously-described techniques for determining which portions a viewer (e.g., viewer B 142) has missed.

At step 704, the summary application identifies, for each of the portions, one or more segments. For example, the summary application may determine that three portions comprise one segment with a corresponding summary. Thus, if the user misses any of the three portions, the system may use the same corresponding segment summary for those three portions. In some embodiments, a portion may comprise several smaller segments of content. For example, a portion may be 3 minutes long and comprise 3 segments. Using this information, the summary application may retrieve information about the segments for each portion from the metadata associated with each portion (e.g., via a data structure similar to that as in FIG. 2) that identifies the segments associated with the portion. The information may include starting and ending times for each segment, the portion to which that segment belongs, a segment identifier, a summary identifier, and other details. Additionally, or alternatively, the summary application may define the segments composing each portion based on available summary data for each portion. The summary application may then retrieve segment summaries from storage (e.g., storage 308 or 414) and/or media content source 402 for each segment. The summary application may determine, based on the available summaries, which segments are associated with summaries. The segments of a portion which are associated with segment summaries may comprise part or all of the portion of the content. The summary application may thus define each segment according to the available summary for that part of the portion. The control circuitry may record information describing each segment composing a portion, and its associated summary, in the data structure such as the data structure depicted in FIG. 2.

At step 706, the summary application retrieves the storyline-specific summary of the portion of the missed content comprising the identified storyline. In this step, the control circuitry retrieves one or more segment summaries, wherein each of the segment summaries is for a segment in the portions of missed content. In some embodiments, the segment summaries may be located in storage or in a database of summaries (e.g., media content source 402). The summary application may use the storyline ID, portion ID, summary ID and/or segment identifier listed in the data structure depicted in FIG. 2 to search for and retrieve the correct summaries. In some embodiments, the summary application may generate summaries for the segments. For example, the summary application may retrieve video clips of the content, text data from the metadata, and/or text data from the closed captioning. The summary application may compile this information into a summary describing a given segment, as previously described. The summary application may then transmit the summary via (e.g., using I/O path 302 or 412) to various components of user device 300 (e.g., display 312 and speaker 314).

At step 708, the summary application concatenates the segment summaries. In some embodiments, the summary application concatenates the storyline-specific summaries by creating a new file with the compiled summaries. For example, the control circuitry may retrieve the portion or segment ID for each portion being summarized from a data structure (e.g., the data structure depicted in FIG. 2). The summary application may then determine a chronological order in which to display the segment summaries. Additionally, or alternatively, the summary application may order the segment summaries according to some other criteria, such as similarities within the content. The summary application may complete this ordering process using information in the metadata for the segments, as previously described. In some embodiments, the summary application may concatenate a combination of retrieved summaries and newly-generated summaries to create the final summary of the portion. Additionally, or alternatively, the summary application may queue the summaries in the correct order for back-to-back presentation to the viewer. The summary application may transmit the portion summaries, in the correct order, to a queue on server 404. The summary application may then transmit the segment summaries from the queue to display 312 on user device 300. Process 700 then continues with step 514, in which the summary application generates, for presentation, the concatenated storyline-specific summary.

Figure 8:
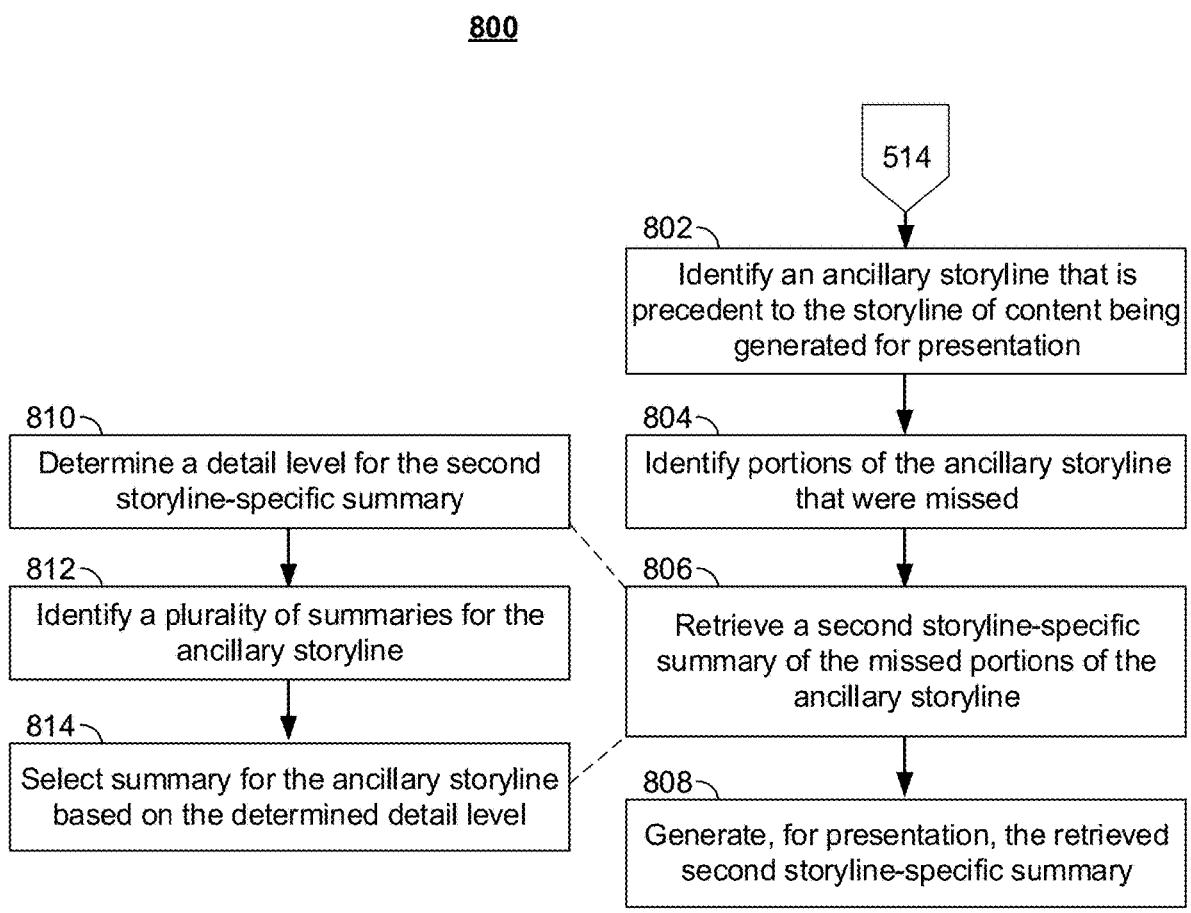
FIG. 8 is a flowchart of a detailed illustrative process for creating a summary for an ancillary storyline of content, in accordance with some embodiments of the disclosure.

FIG. 8 is a flowchart of a detailed illustrative process for creating a summary for an ancillary storyline of content, in accordance with some embodiments of the disclosure. Process 800 begins after step 514. At step 802, the summary application identifies an ancillary storyline that is indicated as being precedent to the storyline of content being generated for presentation. In some embodiments, the summary application determines that a storyline is ancillary to the storyline of content being generated for presentation by analyzing the metadata for both storylines. The summary application (e.g., using control circuitry 304 or 411) may analyze metadata containing identifiers which indicate ancillary content to a particular storyline. In some embodiments, the summary application may determine that a storyline is ancillary to the storyline of content being generated for presentation by analyzing the frames, metadata, close captioning, or another source of data associated with both storylines. For example, the summary application may identify two storylines containing frames which display the same characters or locations. Additionally, or alternatively, the summary application may determine that the retrieved metadata of two storylines contains descriptions with many similarities. Additionally, or alternatively, the summary application may analyze the closed captioning text for two storylines. If the summary application determines that the closed captioning text for the two storylines contains matching information (e.g., character names, events, descriptions, etc.), the summary application may identify that one storyline is ancillary to the other. The summary application may determine that the ancillary storyline is precedent to the storyline of content being generated for presentation by comparing the portion IDs and/or start and end times of the portions of each storyline. The summary application may retrieve this data from a data structure (e.g., a data structure like that depicted in FIG. 2). The summary application may analyze the data to identify an ancillary storyline as precedent to the storyline of content being generated for presentation. At step 804, the summary application identifies portions of the ancillary storyline that were missed. The summary application may use a number of previously-described methods for determining which portions a viewer (e.g., viewer B 142) has missed.

At step 806, the summary application retrieves a second storyline-specific summary of the missed portions of the ancillary storyline. In this step, the summary application retrieves (e.g., using control circuitry 304 or 411) one or more ancillary storyline summaries, wherein each of the ancillary storyline summaries is for a segment in the portions of missed content. In some embodiments, the ancillary storyline summaries may be located in storage or in a database of summaries (e.g., media content source 402). The summary application may use the storyline ID, portion ID, summary ID and/or ancillary storyline identifier listed in the data structure (e.g., the data structure depicted in FIG. 2) to search for and retrieve the correct summaries. In some embodiments, the summary application may generate summaries for the ancillary storylines. For example, the summary application may retrieve video clips of the content, text data from the metadata, and/or text data from the closed captioning. The summary application may compile this information into a summary describing a given ancillary storyline, as previously described. The summary application may then transmit the summary (e.g., using I/O path 302 or 412) to various components of user device 300 (e.g., display 312 and speaker 314).

Steps 810, 812, and 814 describe one embodiment of a method for performing step 806. In step 810, the summary application determines a detail level for the second storyline-specific summary (e.g., terse, normal, verbose). The summary application retrieves metadata describing the ancillary storyline from a database (e.g., media content source 402). The summary application may analyze this retrieved metadata to determine how the ancillary storyline is related to the content being generated for presentation. The summary application may factor descriptions, visual data, closed captioning, reviews, ratings, and other available information into its analysis of the metadata. For example, if the ancillary story contains broad context for the current content being generated, the summary application may decide that terse summary of the ancillary storyline is appropriate. If, instead, the ancillary storyline contains specific details that are relevant to the current content being generated, then the summary application may decide that a verbose summary of the ancillary storyline is appropriate.

At step 812, the summary application identifies one or more summaries for the ancillary storyline. The summary application may access a data structure (e.g., the data structure depicted in FIG. 2) to extract the portion ID and summary ID of the ancillary storyline. The summary application may then access a database (e.g., media content source 402) containing summaries of storylines. The summary application may identify summaries corresponding to the ancillary storyline by using the portion IDs, storyline ID, and summary IDs for the ancillary storyline. Additionally, or alternatively, the summary application may have added functionalities to generate new summaries of different levels of detail through any of the methods previously discussed.

At step 814, the summary application selects a summary for the ancillary storyline based on the determined level of detail. In some embodiments, the summary application may compare the level of detail determined in step 810 with a level of detail of each ancillary summary (e.g., specific, general, overview, etc.). If there is a match, the summary application may select that summary for the ancillary storyline. In some embodiments, the summary application may analyze the content of the summary to determine the level of detail. For example, the summary application may receive a number of summaries for the ancillary storyline. The summary application may analyze each summary to determine if the summary for the ancillary storyline includes the elements that are relevant to the content currently being generated for presentation. In some embodiments, the summary application may select the summary for the ancillary storyline which has the lowest level of detail while still containing the elements that are relevant to the content currently being generated for presentation.

At step 808, the summary application generates, for presentation, the retrieved second storyline-specific summary. The summary application may present the summary for the ancillary storyline before or after the summary for the first storyline-specific summary. Additionally, or alternatively, the summary application may present the two summaries simultaneously through different mediums (e.g., presenting video highlights of the first storyline-specific summary and a textual explanation of the second storyline-specific information). In some embodiments, the summary application may transmit (e.g., using an IO path 302 or 412) the second storyline-specific summary to a secondary user device (e.g., additional user device 144, user equipment 408, or user equipment 410). In some embodiments, the summary application may generate, for display, the summary on the same device on which it is displaying the content 104 (e.g., user equipment 102).

Figure 9:
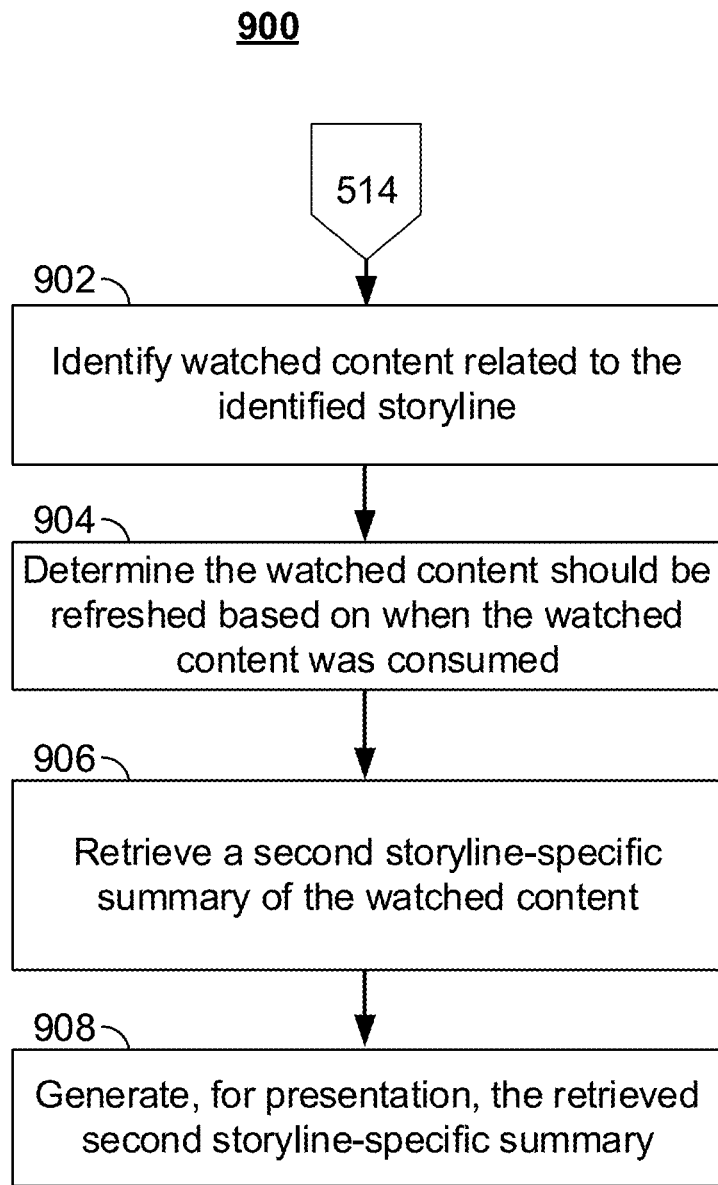
FIG. 9 is a flowchart of a detailed illustrative process for retrieving and presenting summaries of watched content, in accordance with some embodiments of the disclosure.

FIG. 9 is a flowchart of a detailed illustrative process for retrieving and presenting summaries of watched content, in accordance with some embodiments of the disclosure. Process 900 begins after step 514. At step 902, the summary application identifies watched content related to the identified storyline (e.g., the storyline of content being generated for presentation). The summary application may retrieve metadata describing the watched content and the identified storyline from a database (e.g., media content source 402). The summary application may analyze this retrieved metadata to determine how the watched content is related to the identified storyline. The summary application may factor descriptions, visual data, closed captioning, reviews, ratings, and other available information into its analysis of the metadata. Based on this analysis, the summary application can determine which watched content is related to the identified storyline.

At step 904, the summary application determines that the watched content should be refreshed based on when the viewer consumed the watched content. In some embodiments, the summary application may determine that the watched content should be refreshed based on the time stamps. The summary application may retrieve the start and end times of the watched content from a data structure (e.g., the data structure depicted in FIG. 2) along with a timestamp indicating when the user interacted with the content. If the summary application calculates that a sufficient amount of time has passed since the viewer consumed the watched content, then the summary application determines that it should refresh the watched content. For example, the summary application may have a threshold time period configured to, for example, 180 days and content that was consumed outside that threshold is configured to be refreshed in the summary process. Additionally, or alternatively, the summary application may determine that the watched content should be refreshed based on how many unrelated portions of content the viewer has consumed since consuming the watched content. The summary application may determine that too much unrelated content (e.g., portions from unrelated storylines) distracts the viewer (e.g., viewer B 142) from the identified storyline. The summary application may access a data structure (e.g., the data structure depicted in FIG. 2) to extract information such as the portion ID and storyline ID for every portion that the user consumed between the watched content and the identified storyline. If the summary application determines that the number of unrelated portions is too high, then the summary application determines that it should refresh the watched content.

At step 906, the summary application retrieves a second storyline-specific summary of the watched content. In some embodiments, the summaries of the watched content may be located in storage (e.g., 308 or 414) or on a database of summaries (e.g., media content source 402). The summary application may use the storyline ID, portion ID, summary ID and/or another identifier listed in the data structure (e.g., the data structure depicted in FIG. 2) to search for and retrieve the correct summaries. In some embodiments, the summary application may generate summaries for the watched content. For example, the summary application may retrieve video clips of the content, text data from the metadata, and/or text data from the closed captioning. The summary application may compile this information into a summary describing the watched content through any of the previously described methods. The summary application may then save the summary of the watched content in storage (e.g., 308 or 414) and/or queue the summary of the watched content on server 404.

At step 908, the summary application generates, for presentation, the retrieved second storyline-specific summary (e.g., the summary for the watched content). The summary application may present the summary for the watched content before or after the summary for the first storyline-specific summary. Additionally, or alternatively, the summary application may present the two summaries through different mediums (e.g., presenting video highlights of the first storyline-specific summary along and a textual explanation of the second storyline-specific information). In some embodiments, the summary application may transmit the second storyline-specific summary to various components (e.g., display 312 and speaker 314) of a secondary user device (e.g., device 300, additional user device 144, user equipment 408, or user equipment 410) via an I/O path. In some embodiments, the summary application may display the summary on the same device on which it is displaying the content 104 (e.g., user equipment 102).

Figure 10:
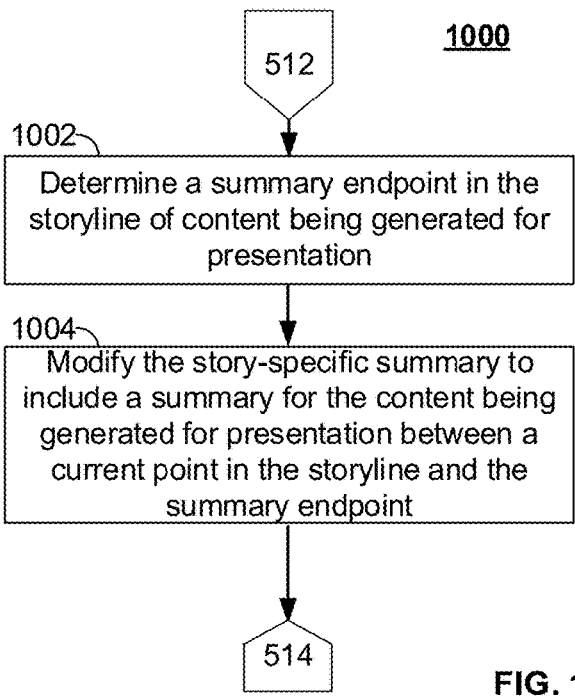
FIG. 10 is a flowchart of a detailed illustrative process for modifying a summary to include content that the viewer missed while consuming the summary, in accordance with some embodiments of the disclosure.

FIG. 10 is a flowchart of a detailed illustrative process for modifying a summary to include content that the viewer misses while consuming the summary, in accordance with some embodiments of the disclosure. Process 1000 is a process which may occur after step 512 and before step 514. At step 1002, the summary application determines a summary endpoint in the storyline of content being generated for presentation. The summary endpoint is a point at which the presentation of the retrieved storyline-specific summary will be complete. The summary application may access the metadata of the retrieved storyline-specific summary to extract a length of the storyline-specific summary. The summary application may then add this length of time to the current point in the storyline to determine the summary endpoint. At step 1004, the summary application modifies the story-specific summary to include a summary for the content being generated for presentation between the current point in the storyline and the summary endpoint. In some embodiments, the summary application may extract information about the content between the current point and the summary endpoint from a data structure (e.g., the data structure depicted in FIG. 2), including portion IDs, storyline IDs, start and end times, Summary IDs, and dependency information. The summary application may then use this identifying information for the content between the current point and the summary endpoint to locate additional summary content. The summary application may search storage (e.g., storage 308 or 414) and/or a database of summaries (e.g., media content source 402) for a summary corresponding to this content. Once the summary application has received the appropriate summary for the content between the current point and the summary endpoint, the summary application may modify the first storyline-specific summary to include the additional summary. In some embodiments, the summary application may modify the first summary by adding the additional summary to the end of the summary presentation. In some embodiments, the summary application may modify the first summary by presenting the additional summary through a different method (e.g., on a different device or in a different medium, such as text, video, audio). Process 1000 then continues with step 514, in which the summary application generates, for presentation, the modified storyline-specific summary.

Figure 11:
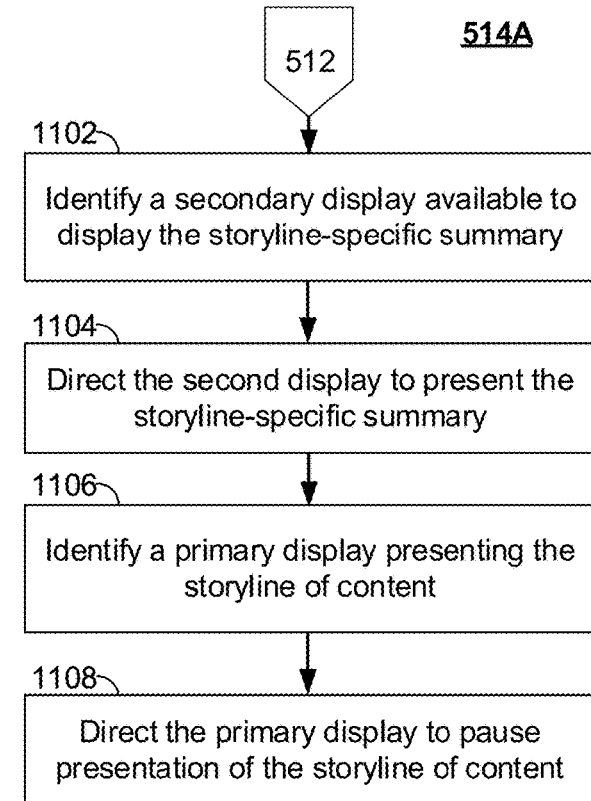
FIG. 11 is a flowchart of a detailed illustrative process for optimizing the presentation of the storyline-specific summary to the viewer, in accordance with some embodiments of the disclosure.

FIG. 11 is a flowchart of a detailed illustrative process for optimizing the presentation of the storyline-specific summary to the viewer, in accordance with some embodiments of the disclosure. Process 514A is one embodiment of a method for performing step 514 of FIG. 5 and begins after step 512. At step 1102, the summary application identifies a secondary display that is available to display the storyline-specific summary and is not currently presenting the storyline of content. In some embodiments, summary application may access, through communication network 406, any available secondary devices in the network (e.g., user equipment 408 and 410). The summary application may also detect additional secondary devices (e.g., through Bluetooth or Wi-Fi connectivity or through GPS data) which are available and in the vicinity of the summary application (e.g., additional user device 144 and user equipment device 300). The summary application may assess the functionality of the displays of the secondary devices (e.g., display 312 and speakers 314) to ensure that the displays are adequate for the output of the summary.

At step 1104, the summary application directs the second display to present the storyline-specific summary. In some embodiments, the summary application may send a signal to the server 404. The signal may cause the server 404 to queue the storyline-specific summary for presentation on the secondary display. The summary application may then cause the server 404 to transmit the storyline-specific summary via I/O path 412 to the secondary display for presentation. The summary application may utilize various features of the secondary display (e.g., display 312 and speaker 314) depending on the type of summary presentation (e.g., photos, video clips, text, voice over, etc.).

At step 1106, the summary application identifies a primary display presenting the storyline of content. In some embodiments, the summary application may determine the device on which is it presenting the storyline of content by accessing the signals being transmitted through an I/O path (e.g., 302 or 412) to and from various devices. The summary application may identify one or more primary displays which are presenting the storyline of content.

At step 1108, the summary application directs the primary display to pause presentation of the storyline of content during presentation of the retrieved storyline-specific summary. In some embodiments, the summary application may instruct the server to buffer the storyline of content to a content cache for the duration of the storyline-specific summary. Following the completion of the storyline-specific summary, the summary application may instruct sever 404 to resume presentation of the storyline content on the primary display.

Figure 12:
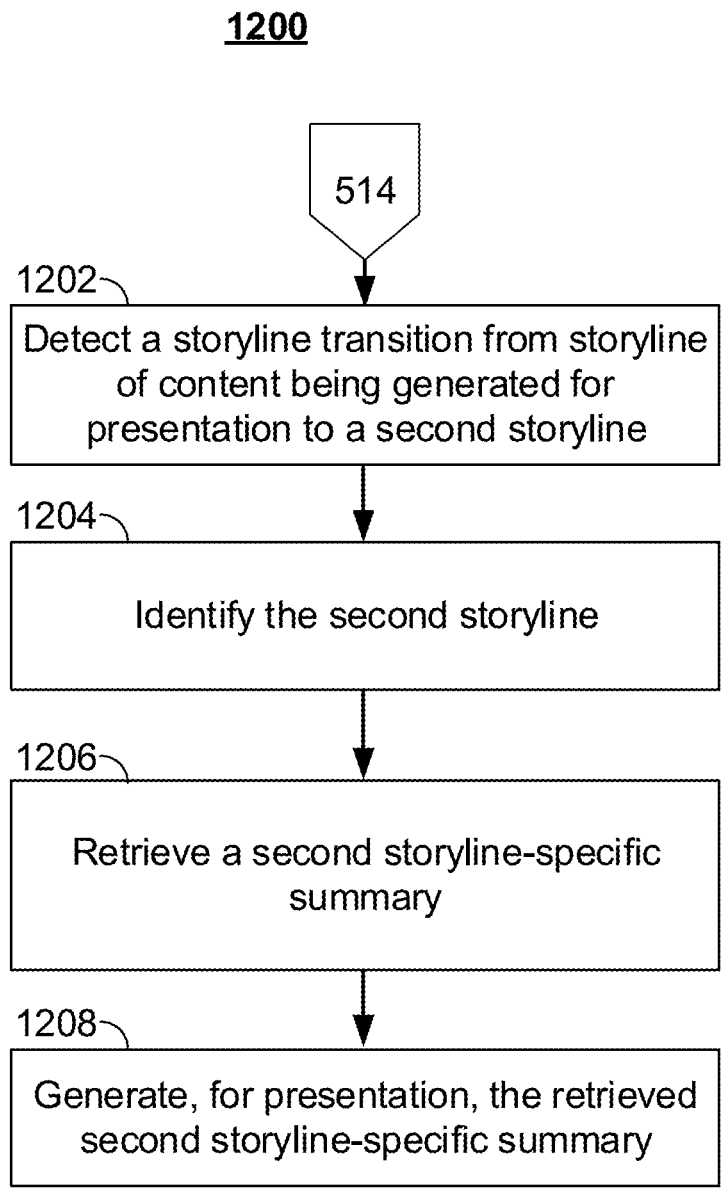
FIG. 12 is a flowchart of a detailed illustrative process for generating a storyline-specific summary for a second storyline, in accordance with some embodiments of the disclosure.

FIG. 12 is a flowchart of a detailed illustrative process for generating a storyline-specific summary for a second storyline, in accordance with some embodiments of the disclosure. Process 1200 is an additional process which may occur after step 514. At step 1202, the summary application detects a storyline transition from the storyline of content being generated for presentation to a second storyline. The summary application may access a data structure (e.g., the data structure depicted in FIG. 2) which contains storyline identifiers for each portion of the content. The summary application may analyze the data structure to find the first portion, of the upcoming portions, which has a different storyline from the current storyline.

At step 1204, the summary application identifies the second storyline. In some embodiments, the summary application may identify the second storyline by the storyline identifiers retrieved from the data structure at step 1202.

At step 1206, the summary application retrieves a second storyline-specific summary of a second portion of the missed content comprising the identified second storyline. In some embodiments, the second storyline-specific summaries may be located in storage (e.g., 308 or 414) or on a database of summaries (e.g., media content source 402). The summary application may use the storyline ID, portion ID, summary ID and/or other information listed in the data structure (e.g., the data structure depicted in FIG. 2) to search for and retrieve the correct summaries. In some embodiments, the summary application may generate second storyline-specific summaries. For example, the summary application may retrieve video clips of the content, text data from the metadata, and/or text data from the closed captioning. The summary application may compile this information into a summary describing a given storyline (e.g., using any of the methods previously described). The summary application may then transmit the summary via an I/O path (e.g., 302 or 412) to a user device for presentation.

At step 1208, the summary application generates, for presentation, the retrieved second storyline-specific summary. The summary application may present the summary for the watched content before or after the summary for the first storyline-specific summary. Additionally, or alternatively, the summary application may present the two summaries simultaneously through different mediums (e.g., presenting video highlights of the first storyline-specific summary along with simultaneous textual explanation of the second storyline-specific information). In some embodiments, the summary application may transmit the second storyline-specific summary to various components (e.g., display 312 and speaker 314) of a secondary user device (e.g., device 300, additional user device 144, user equipment 408, or user equipment 410) via an I/O path (e.g., 302 or 412). In some embodiments, the summary application may display the summary on the same device on which it is displaying the content 104 (e.g., user equipment 102).

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for summarizing missed portions of storylines in a single content item, the method comprising:
   tracking the presence of a user during presentation of the single content item, wherein the single content item comprises a plurality of storylines, each storyline being a narrative that, along with other narratives, makes up a plot in the single content item, wherein each storyline comprises a plurality of portions, each of the plurality of portions comprising a part of the narrative of the storyline that is interwoven throughout the single content item with other portions of other storylines;
   detecting that the user was not consuming the single content item for a period of time;
   detecting missed content of the single content item, wherein the missed content comprises a plurality of portions of the single content item that were generated for presentation during the period of time and each portion comprises a different storyline;
   in response to detecting the missed content:
   accessing metadata corresponding to the single content item, the metadata including a plurality of storyline identifiers, each corresponding to a portion of the single content item;
   identifying, based on the metadata, a storyline of a portion of the single content item currently being generated for presentation;
   retrieving a storyline-specific summary of only those portions of the missed content of the single content item that comprise the identified storyline, wherein the missed content includes portions that comprise a second storyline different from the identified storyline; and
   generating, for presentation, the retrieved storyline-specific summary.

2. The method of claim 1, wherein retrieving a storyline-specific summary of a portion of the missed content comprising the identified storyline comprises:
identifying, based on the metadata, a plurality of storyline-specific portions in the missed content, each of the plurality of storyline-specific portions associated with the storyline identifier;
retrieving summaries for the plurality of storyline-specific portions in the missed content; and
concatenating the summaries for the plurality of storyline-specific portions in the missed content to generate the storyline-specific summary of a portion of the missed content comprising the identified storyline.

3. The method of claim 1, further comprising:
identifying the plurality of portions in the missed content;
identifying, for each of the plurality of portions, a plurality of segments, wherein each of the plurality of segments is associated with a segment summary; and
wherein retrieving the storyline-specific summary of only those portions of the missed content that comprise the identified storyline comprises:
retrieving a plurality of segment summaries, wherein each of the plurality of segment summaries is for a segment in the plurality of portions in the missed content; and
concatenating the plurality of segment summaries.

4. The method of claim 1, further comprising:
identifying an ancillary storyline that is indicated as being precedent to the storyline of content being generated for presentation;
identifying portions of the ancillary storyline that were missed;
retrieving a second storyline-specific summary of the missed portions of the ancillary storyline; and
generating, for presentation, the retrieved second storyline-specific summary.

5. The method of claim 4, wherein retrieving a second storyline-specific summary of the missed portions of the ancillary storyline comprises:
determining a detail level for the second storyline-specific summary;
identifying a plurality of summaries for the ancillary storyline; and
selecting one of the plurality of summaries for the ancillary storyline based on the determined detail level.

6. The method of claim 1, further comprising:
identifying watched content related to the identified storyline;
determining the watched content should be refreshed based on when the watched content was consumed;
retrieving a second storyline-specific summary of the watched content; and
generating, for presentation, the retrieved second storyline-specific summary.

7. The method of claim 1, further comprising:
determining a summary endpoint in the storyline of content being generated for presentation, wherein the summary endpoint is a point at which the presentation of the retrieved storyline-specific summary will complete; and
modifying the storyline-specific summary to include a summary for the content being generated for presentation between a current point in the storyline and the summary endpoint.

8. The method of claim 1, wherein generating, for presentation, the retrieved storyline-specific summary comprises:
identifying a secondary display from a plurality of display, wherein the secondary display is available to display the storyline-specific summary and is not presenting the storyline of content; and
directing the secondary display to present the storyline-specific summary.

9. The method of claim 1, wherein generating, for presentation, the retrieved storyline-specific summary further comprises:
identifying a primary display from a plurality of display, wherein the primary display is presenting the storyline of content; and
directing the primary display to pause presentation of the storyline of content during presentation of the retrieved storyline-specific summary.

10. A system for summarizing missed portions of storylines in a single content item, the system comprising:
communication circuitry; and
control circuitry configured to:
track the presence of a user during presentation of the single content item, wherein the single content item comprises a plurality of storylines, each storyline being a narrative that, along with other narratives, makes up a plot in the single content item, wherein each storyline comprises a plurality of portions, each of the plurality of portions comprising a part of the narrative of the storyline that is interwoven throughout the single content item with other portions of other storylines;
detect that the user was not consuming the single content item from a period of time;
detect missed content of the single content item, wherein the missed content comprises a plurality of portions of the single content item that were generated for presentation during the period of time and each portion comprises a different storyline;
in response to detecting the missed content:
access metadata corresponding to the single content item, the metadata including a plurality of storyline identifiers, each corresponding to a portion of the single content item;
identify, based on the metadata, a storyline of a portion of the single content item currently being generated for presentation;
retrieve a storyline-specific summary of only those portions of the missed content of the single content item that comprise the identified storyline, wherein the missed content includes portions that comprise a second storyline different from the identified storyline; and
generate, for presentation, the retrieved storyline-specific summary.

11. The system of claim 10, wherein the control circuitry is further configured to retrieve a storyline-specific summary of a portion of the missed content comprising the identified storyline by:
identifying, based on the metadata, a plurality of storyline-specific portions in the missed content, each of the plurality of storyline-specific portions associated with the storyline identifier;
retrieving summaries for the plurality of storyline-specific portions in the missed content; and
concatenating the summaries for the plurality of storyline-specific portions in the missed content to generate the storyline-specific summary of a portion of the missed content comprising the identified storyline.

12. The system of claim 10, wherein the control circuitry is further configured to:
identify the plurality of portions in the missed content;

identify, for each of the plurality of portions, a plurality of segments, wherein each of the plurality of segments is associated with a segment summary; and wherein the control circuitry configured to retrieve the storyline-specific summary of only those portions of the missed content that comprise the identified storyline is further configured to:

retrieve a plurality of segment summaries, wherein each of the plurality of segment summaries is for a segment in the plurality of portions in the missed content; and concatenate the plurality of segment summaries.

13. The system of claim 10, wherein the control circuitry is further configured to:

identify an ancillary storyline that is indicated as being precedent to the storyline of content being generated for presentation;

identify portions of the ancillary storyline that were missed;

retrieve a second storyline-specific summary of the missed portions of the ancillary storyline; and generate, for presentation, the retrieved second storyline-specific summary.

14. The system of claim 13, wherein the control circuitry is further configured to retrieve a second storyline-specific summary of the missed portions of the ancillary storyline by:

determining a detail level for the second storyline-specific summary;

identifying a plurality of summaries for the ancillary storyline; and selecting one of the plurality of summaries for the ancillary storyline based on the determined detail level.

15. The system of claim 10, wherein the control circuitry is further configured to:

identify watched content related to the identified storyline;

determine the watched content should be refreshed based on when the watched content was consumed;

retrieve a second storyline-specific summary of the watched content; and generate, for presentation, the retrieved second storyline-specific summary.

16. The system of claim 10, wherein the control circuitry is further configured to:

determine a summary endpoint in the storyline of content being generated for presentation, wherein the summary endpoint is a point at which the presentation of the retrieved storyline-specific summary will complete; and modify the storyline-specific summary to include a summary for the content being generated for presentation between a current point in the storyline and the summary endpoint.

17. The system of claim 10, wherein the control circuitry is further configured to generate, for presentation, the retrieved storyline-specific summary by:

identifying a secondary display from a plurality of display, wherein the secondary display is available to display the storyline-specific summary and is not presenting the storyline of content; and directing the secondary display to present the storyline-specific summary.

18. The system of claim 10, wherein the control circuitry is further configured to generate, for presentation, the retrieved storyline-specific summary by:

identifying a primary display from a plurality of display, wherein the primary display is presenting the storyline of content; and directing the primary display to pause presentation of the storyline of content during presentation of the retrieved storyline-specific summary.

19. The system of claim 10, wherein the control circuitry is further configured to:

detect a storyline transition from storyline of content being generated for presentation to a second storyline;

identify the second storyline;

retrieve a second storyline-specific summary of a second portion of the missed content comprising the identified second storyline; and generate, for presentation, the retrieved second storyline-specific summary.

20. The method of claim 1, further comprising:

detecting a storyline transition from storyline of content being generated for presentation to a second storyline;

identifying the second storyline;

retrieving a second storyline-specific summary of a second portion of the missed content comprising the identified second storyline; and generating, for presentation, the retrieved second storyline-specific summary.

* * * * *